(12) United States Patent
Menard et al.

(10) Patent No.: US 10,169,941 B2
(45) Date of Patent: Jan. 1, 2019

(54) METHOD FOR DETECTING AN IDENTIFIER FOR STARTING A MOTOR VEHICLE (71) Applicant: VALEO COMFORT AND DRIVING ASSISTANCE, Créteil (FR)

(72) Inventors: Eric Menard, Créteil (FR); Fabienne Masson, Créteil (FR); Francis Delaunay, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/509,415

(22) PCT Filed: Sep. 8, 2015

(86) PCT No.: PCT/FR2015/052380
§ 371 (c)(1),
(2) Date: Mar. 7, 2017

(87) PCT Pub. No.: WO2016/038294
PCT Pub. Date: Mar. 17, 2016

(65) Prior Publication Data
US 2017/0243422 A1 Aug. 24, 2017

(30) Foreign Application Priority Data

Sep. 8, 2014 (FR) ..................................... 14 02018

(51) Int. Cl.
*H04B 17/12* (2015.01)
*G07C 9/00* (2006.01)
(Continued)

(52) U.S. Cl.
CPC ........ *G07C 9/00309* (2013.01); *B60R 25/209* (2013.01); *B60R 25/245* (2013.01);
(Continued)

(58) Field of Classification Search
CPC .............................. H04B 17/12; H04B 17/138
(Continued)

(56) References Cited

U.S. PATENT DOCUMENTS

2003/0216124 A1   11/2003   Emmerling et al.
2005/0258936 A1*  11/2005   Ghabra ................. B60R 25/245
                                                     340/5.72
(Continued)

FOREIGN PATENT DOCUMENTS

DE   10 2013 227204 A1   7/2014
EP      0 841 448 A1      5/1998
(Continued)

OTHER PUBLICATIONS

Written Opinion of the International Searching Authority issued in PCT/FR2015/052380, dated Mar. 11, 2016 (7 pages).
(Continued)

*Primary Examiner* — Raj Chakraborty
(74) *Attorney, Agent, or Firm* — Osha Liang LLP (57) ABSTRACT

The present invention concerns a method (PR) for detecting an identifier (Id) for starting a motor vehicle (V), said motor vehicle comprising a first antenna (A1) and said identifier (Id) comprising a second antenna (A2). The method (PR) is characterized in that it comprises:
  transmitting, by said first antenna (A1), a first Bluetooth Low Energy™ signal (Sg1) to said identifier (Id) at a nominal power (P1);
  measuring the power (P1') of said corresponding signal (Sg1') received by the second antenna (A2) of said identifier (Id);
  comparing said measured power (P1') with a threshold power (Ps), said threshold power (Ps) corresponding to a threshold distance (ds) from said first antenna (A1) that is less than the radius (r1) of a circle (C1) inscribed
(Continued)

within the passenger compartment (H) of the motor vehicle (V), said circle (C1) being centered on said first antenna (A1);

authorizing the starting of the motor vehicle (V) if the measured power (P1') is greater than or equal to said threshold power (Ps).

20 Claims, 3 Drawing Sheets

(51) Int. Cl.
    *B60R 25/24*     (2013.01)
    *H04B 17/318*     (2015.01)
    *H04W 4/80*     (2018.01)
    *B60R 25/20*     (2013.01)
    *H04M 1/725*     (2006.01)
    *H04W 4/02*     (2018.01)
    *H04W 52/04*     (2009.01)

(52) U.S. Cl.
    CPC ........... *H04B 17/12* (2015.01); *H04B 17/318* (2015.01); *H04M 1/7253* (2013.01); *H04W 4/023* (2013.01); *H04W 4/80* (2018.02); *H04W 52/04* (2013.01); *B60R 2325/101* (2013.01); *B60R 2325/205* (2013.01); *G07C 2009/00547* (2013.01); *G07C 2209/63* (2013.01)

(58) Field of Classification Search
    USPC ................................................ 455/41.1, 41.2
    See application file for complete search history.

(56) References Cited

U.S. PATENT DOCUMENTS

| | | | |
|---|---|---|---|
| 2007/0258421 A1* | 11/2007 | Alizadeh-Shabdiz | G01S 5/0252 370/338 |
| 2009/0027160 A1* | 1/2009 | Ikushima | B60R 25/24 340/5.61 |
| 2009/0315682 A1* | 12/2009 | Leconte | G07C 9/00309 340/10.1 |
| 2014/0044007 A1* | 2/2014 | Smadi | H04W 76/10 370/254 |
| 2014/0172192 A1* | 6/2014 | Kato | H04M 1/72533 701/2 |
| 2014/0188309 A1* | 7/2014 | Caratto | B60R 25/00 701/2 |
| 2014/0240091 A1 | 8/2014 | Talty et al. | |
| 2015/0373500 A1* | 12/2015 | Chen | H04W 4/029 455/456.1 |

FOREIGN PATENT DOCUMENTS

| | | |
|---|---|---|
| FR | 2 910 751 A1 | 6/2008 |
| WO | 2005/088561 A2 | 9/2005 |
| WO | 2013/094661 A1 | 6/2013 |
| WO | 2014/091654 A1 | 6/2014 |

OTHER PUBLICATIONS

International Search Report issued in PCT/FR2015/052380, dated Mar. 11, 2016 (3 pages).

* cited by examiner

METHOD FOR DETECTING AN IDENTIFIER FOR STARTING A MOTOR VEHICLE

TECHNICAL FIELD

The present invention relates to a method for detecting an identifier for starting a motor vehicle.

The present invention also relates to a system for detecting an identifier for starting an associated motor vehicle.

It is particularly, but not exclusively, applicable to the field of motor vehicles.

TECHNICAL BACKGROUND OF THE INVENTION

In the field of motor vehicles, there are existing methods for detecting an identifier for starting a motor vehicle, which may be used to determine whether the identifier is inside the motor vehicle, with a margin not exceeding twenty centimeters around the motor vehicle, according to a Thatcham standard which is well known to those skilled in the art. Thus it is ensured that nobody can start the motor vehicle while the vehicle's user and his identifier are outside said vehicle. To provide this function, the motor vehicle comprises a first antenna which transmits a signal at low frequency (125 kHz), and the identifier comprises a second antenna which receives this low frequency signal. This low frequency signal can be used to delimit in a precise manner the areas inside and outside the motor vehicle, in order to determine whether the identifier is in fact located in the passenger compartment of the motor vehicle.

One drawback of this prior art is that, if it is desired to use a method compatible with identifiers such as cellphones using Bluetooth Low Energy™ technology, the motor vehicle must comprise a first antenna which transmits a Bluetooth Low Energy™ signal to communicate with said cellphones. With such technology, it is difficult to delimit different areas precisely, notably because of parasitic signals caused by reflections of the transmitted signals from the metal parts of the motor vehicle, these reflections being present for signals other than low frequency signals.

GENERAL DESCRIPTION OF THE INVENTION

For this purpose, the invention proposes a method for detecting an identifier for starting a motor vehicle, said motor vehicle comprising a first antenna and said identifier comprising a second antenna, according to which said method comprises:
  transmitting, by means of said first antenna, a first Bluetooth Low Energy™ signal toward said identifier at a nominal power;
  measuring the power of said corresponding signal received by the second antenna of said identifier;
  comparing said measured power with a threshold power, said threshold power corresponding to a threshold distance from said first antenna which is smaller than the radius of a circle inscribed in the passenger compartment of the motor vehicle, said circle being centered on said first antenna;
  enabling the starting of the motor vehicle if the measured power is greater than or equal to said threshold power.

According to non-limiting embodiments, the detection method may further have one or more supplementary characteristics from among the following.

According to a non-limiting embodiment, the threshold distance is equal to twenty centimeters, plus or minus ten centimeters.

According to a non-limiting embodiment, the method also comprises:
  positioning said identifier at a reference position;
  adjusting the second antenna of said identifier for use with the first antenna, on the first use of said identifier with the motor vehicle and/or on request.

According to a non-limiting embodiment, said first antenna is placed at a predefined distance from the reference position of the motor vehicle and the adjustment comprises:
  transmitting, by means of the first antenna, a first calibration signal at the nominal power toward the second antenna;
  measuring the power of said corresponding reception signal received by said second antenna, and sending said measured power toward said first antenna;
  comparing said measured power with a theoretical power corresponding to said predefined distance, using a regression curve of power as a function of distance;
  determining whether there is an offset between said measured power and said theoretical power;
  if there is an offset, modifying the nominal power of the first transmitted Bluetooth Low Energy™ signal as a function of said offset, or modifying the threshold power as a function of said offset.

According to a non-limiting embodiment, on the first use of the identifier with the motor vehicle, the method further comprises the display by the identifier on a screen of a message inviting the user of said identifier to position said identifier in the reference position and to launch said adjustment.

According to a non-limiting embodiment, said first antenna is placed at the reference position.

According to a non-limiting embodiment, the method further comprises enabling the starting of the motor vehicle solely if the identifier is placed at the reference position of the motor vehicle.

According to a non-limiting embodiment, the identifier is a cellphone.

According to a non-limiting embodiment, the method also comprises:
  positioning said identifier at a reference position;
  adjusting the first antenna of said identifier for use with the second antenna.

According to a non-limiting embodiment, said first antenna is placed at a predefined distance from the reference position of the motor vehicle and the adjustment comprises:
  transmitting, by the second antenna, a first calibration signal at the nominal power toward the first antenna;
  measuring the power of said corresponding reception signal received by said first antenna;
  comparing said measured power with a theoretical power corresponding to said predefined distance, using a regression curve of power as a function of distance;
  determining whether there is an offset between said measured power and said theoretical power;
  if there is an offset, modifying the nominal power of the first transmitted Bluetooth Low Energy™ signal as a function of said offset, or modifying the threshold power as a function of said offset.

According to a non-limiting embodiment, a plurality of calibration signals are sent and a plurality of power measurements are made, and the measured power compared with said theoretical power is equal to the mean of the measured powers lying within a range which depends on the standard deviation of the plurality of power measurements.

A system for detecting an identifier for starting a motor vehicle is also proposed, said motor vehicle comprising a first antenna and a computer comprising a processing unit, and said identifier comprising a second antenna and a processing unit, according to which said system comprises said identifier and said first antenna:

said identifier being adapted for:
  receiving a first Bluetooth Low Energy™ signal transmitted by said first antenna at a nominal power;
  measuring the power of said corresponding signal received by the second antenna;
  comparing said measured power with a threshold power, said threshold power corresponding to a threshold distance from said first antenna which is smaller than the radius of a circle inscribed in the passenger compartment of the motor vehicle, said circle being centered on said first antenna;
said first antenna of the motor vehicle being adapted for:
  transmitting a first Bluetooth Low Energy™ signal toward said identifier at a nominal power;
said computer being adapted for enabling the starting of the motor vehicle if the measured power is greater than or equal to said threshold power.

A system has also been proposed for detecting an identifier for starting a motor vehicle, said motor vehicle comprising a first antenna and a computer comprising a processing unit and said identifier comprising a second antenna and a processing unit, according to which said system comprises said identifier and said first antenna:

said identifier being adapted for:
  receiving a first Bluetooth Low Energy™ signal transmitted by said first antenna at a nominal power;
  measuring the power of said corresponding signal received by the second antenna;
said first antenna of the motor vehicle being adapted for:
  transmitting a first Bluetooth Low Energy™ signal toward said identifier at a nominal power;
said computer is adapted for:
  comparing said measured power with a threshold power, said threshold power corresponding to a threshold distance from said first antenna which is smaller than the radius of a circle inscribed in the passenger compartment of the motor vehicle, said circle being centered on said first antenna;
  enabling the starting of the motor vehicle if the measured power is greater than or equal to said threshold power.

According to non-limiting embodiments, the detection system may further have one or more supplementary characteristics from among the following.

According to a non-limiting embodiment, the first antenna may be local to the computer of the motor vehicle or remote.

According to a non-limiting embodiment, the threshold distance is equal to twenty centimeters, plus or minus ten centimeters.

According to a non-limiting embodiment, said identifier is adapted to be positioned at a reference position and said first antenna is adapted for adjusting the second antenna on the first use of said identifier with the motor vehicle and/or on request.

According to a non-limiting embodiment, said first antenna is placed at a predefined distance from the reference position of the motor vehicle and, according to this embodiment, for the purpose of adjustment:

the first antenna is adapted for:
  sending a first calibration signal at the nominal power toward the second antenna;
the second antenna is adapted for:
  measuring the power of said corresponding reception signal received;
  sending said measured power toward said first antenna;
the processing unit of the computer is also adapted for:
  comparing said measured power with a theoretical power corresponding to said predefined distance, using a regression curve of power as a function of distance;
  determining whether there is an offset between said measured power and said theoretical power;
  if there is an offset, modifying the nominal power of the first transmitted Bluetooth Low Energy™ signal as a function of said offset, or modifying the threshold power as a function of said offset.

According to a non-limiting embodiment, said first antenna is placed at a predefined distance from the reference position of the motor vehicle and, according to this embodiment, for the adjustment:

the first antenna is adapted for:
  sending a first calibration signal at the nominal power toward the second antenna;
the second antenna is adapted for:
  measuring the power of said corresponding reception signal received;
the processing unit of the identifier is also adapted for:
  comparing said measured power with a theoretical power corresponding to said predefined distance, using a regression curve of power as a function of distance;
  determining whether there is an offset between said measured power and said theoretical power;
  if there is an offset, sending said offset to said first antenna;
  modifying the nominal power of the first transmitted Bluetooth Low Energy™ signal as a function of said offset, or modifying the threshold power as a function of said offset.

According to a non-limiting embodiment, said second antenna is adapted for adjusting the first antenna.

According to a non-limiting embodiment, said first antenna is placed at a predefined distance from the reference position of the motor vehicle and, according to this embodiment, for the adjustment:

the second antenna is adapted for:
  sending a first calibration signal at the nominal power toward the first antenna;
the first antenna is adapted for:
  measuring the power of said corresponding reception signal received;
  sending said measured power toward said second antenna;
the processing unit of the identifier is also adapted for:
  comparing said measured power with a theoretical power corresponding to said predefined distance, using a regression curve of power as a function of distance;
  determining whether there is an offset between said measured power and said theoretical power;
  if there is an offset, modifying the nominal power of the first transmitted Bluetooth Low Energy™ signal as a function of said offset, or modifying the threshold power as a function of said offset.

According to a non-limiting embodiment, said first antenna is placed at a predefined distance from the reference position of the motor vehicle and, according to this embodiment, for the adjustment:
the second antenna is adapted for:
sending a first calibration signal at the nominal power toward the first antenna;
the first antenna is adapted for:
measuring the power of said corresponding reception signal received;
the processing unit of the computer is also adapted for:
comparing said measured power with a theoretical power corresponding to said predefined distance, using a regression curve of power as a function of distance;
determining whether there is an offset between said measured power and said theoretical power;
if there is an offset, modifying the nominal power of the first transmitted Bluetooth Low Energy™ signal as a function of said offset, or modifying the threshold power as a function of said offset.

According to a non-limiting embodiment, the identifier is also adapted for displaying on a screen a message inviting the user of said identifier to position said identifier at the reference position and to launch the adjustment.

According to a non-limiting embodiment, the system is adapted for enabling the starting of the motor vehicle solely if the identifier is placed at the reference position of the motor vehicle.

According to a non-limiting embodiment, the identifier is a cellphone.

BRIEF DESCRIPTION OF THE DRAWINGS

The invention and its various applications will be more fully understood from a perusal of the following description and the accompanying figures.

DESCRIPTION OF EMBODIMENTS OF THE INVENTION

Elements shown in different figures which are identical in their structure or function are given the same references, unless indicated otherwise.

The invention relates to a method PR for detecting an identifier Id for starting a motor vehicle V, said motor vehicle comprising a first antenna A1 and said identifier Id comprising a second antenna A2.

The detection method PR is executed by a system for detecting an identifier Id for starting the motor vehicle V.

Figure 1:
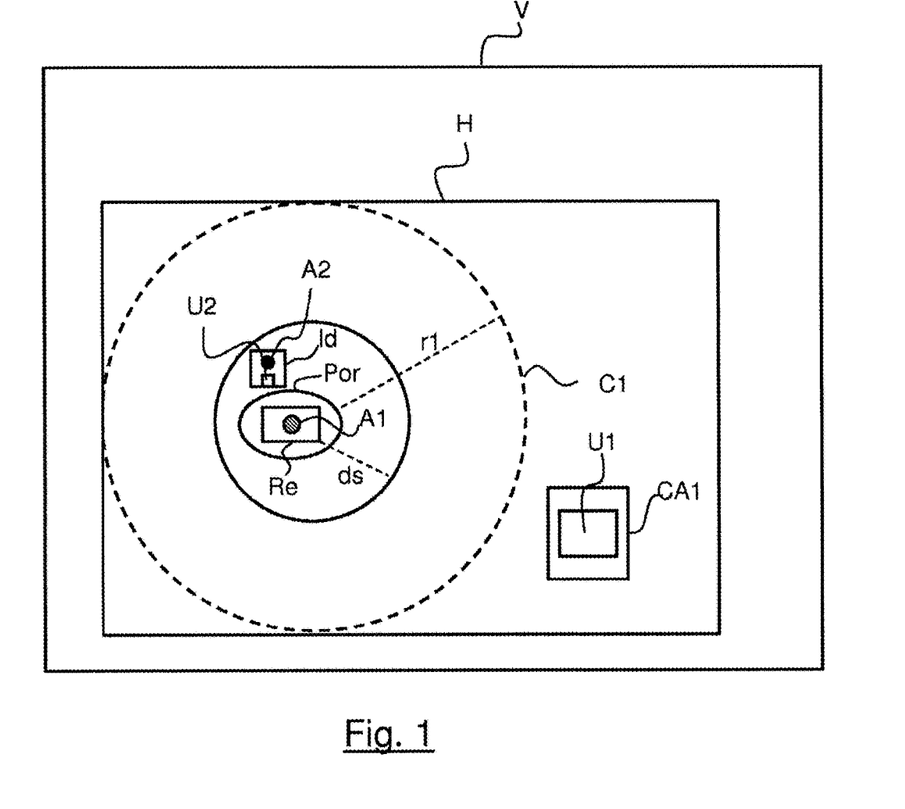
FIG. 1 shows a diagram of a system for detecting an identifier for starting a motor vehicle, enabling a method for detecting an identifier for starting a motor vehicle to be executed according to a non-limiting embodiment of the invention.

FIG. 1 shows said detection system SYS.

This comprises:
a first antenna A1 integrated into the passenger compartment H of the motor vehicle V;
an identifier Id comprising a second antenna A2;
a computer CA1 of the motor vehicle V, said computer comprising a processing unit U1; and
a processing unit U2 of the identifier Id.

It should be noted that a processing unit comprises one or more processors.

In a non-limiting embodiment, the first antenna A1 may be local to the computer CA1 or remote. Thus, the computer CA1 may comprise said first antenna A1. In FIG. 1, the first antenna A1 is remote.

The identifier Id of the motor vehicle can be used to access the motor vehicle, and also to start the motor vehicle V. In non-limiting examples, the identifier Id is an electronic key, a badge, or a cellphone such as a smartphone.

In a non-limiting embodiment, the identifier Id uses Bluetooth Low Energy™ technology to communicate with the motor vehicle V, both for accessing the vehicle, that is to say for opening an openable body section of vehicle (a door or the trunk), or for starting the vehicle.

Since the procedure for accessing a motor vehicle via an identifier Id is well known to those skilled in the art, it is not described here.

Thus the two antennas A1, A2 are adapted to communicate by means of Bluetooth Low Energy™ technology.

In the course of the detection method PR, the aim is to determine whether the identifier Id is inside the passenger compartment H of the motor vehicle, and more particularly whether it is located at a distance smaller than the threshold distance ds from the first antenna A1.

In a non-limiting embodiment, the threshold distance ds is equal to twenty centimeters, plus or minus ten centimeters. Thus, in a non-limiting example, it is determined whether the identifier Id is located twenty centimeters from the first antenna A1.

As shown in FIG. 1, the motor vehicle V comprises the passenger compartment H. A circle C1 inscribed in said passenger compartment H and centered on the first antenna A1 is defined. As may be seen, the threshold distance ds is such that it is smaller than the radius r1 of this circle C1. Said circle C1 defines the internal limit area of the passenger compartment H, centered on the first antenna A1. Outside this area, it is possible to be located outside the vehicle. Thus the circle corresponds to the transmission of the first antenna A1 at a certain power. If the first antenna A1 transmits at a power below the power corresponding to this circle, any identifiers located outside the vehicle will not be enabled to start the vehicle. Accordingly, a threshold distance ds which is smaller than the radius r1 of this circle C1 is defined, in order to prevent starting by identifiers located outside the circle C1.

If the identifier Id is placed at a sufficient distance from the first antenna A1, the identifier Id is adapted for:
receiving a first Bluetooth Low Energy™ signal Sg1 transmitted by said first antenna A1;
measuring the power P1' of said corresponding signal Sg1' received by the second antenna A2.

In a first non-limiting embodiment, the identifier Id (via its processing unit U2) is also adapted for comparing said measured power P1' with a threshold power Ps, said threshold power Ps corresponding to a threshold distance ds from said first antenna A1 which is smaller than the radius r1 of the circle C1 inscribed in the passenger compartment H of the motor vehicle V, said circle C1 being centered on said first antenna A1.

In a second non-limiting embodiment, the computer CA1 of the motor vehicle V is adapted for comparing said measured power P1' with a threshold power Ps, said threshold power Ps corresponding to a threshold distance ds from said first antenna A1 which is smaller than the radius r1 of the circle C1 inscribed in the passenger compartment H of the motor vehicle V, said circle C1 being centered on said first antenna A1.

For its part, said first antenna A1 of the motor vehicle V is adapted for:
- transmitting a first Bluetooth Low Energy™ signal Sg1 toward said identifier Id at a nominal power P1;
- receiving, via the Bluetooth Low Energy™ communications protocol, the result of the comparison between the powers P1' and Ps; and
- transmitting said result to the computer CA1 of the motor vehicle V.

The computer CA1 of the motor vehicle V is also adapted for enabling the starting of the motor vehicle V if the measured power P1' is greater than or equal to said threshold power Ps.

It should be noted that the first antenna A1 transmits at a constant power P1, called the nominal power. The nominal power P1 is the operating power of the antenna A1.

As explained below, the power of the signal transmitted by the antenna A1 may be modified according to the result of the calibration described below.

The calibration may be used to adjust the communication channel between the first antenna A1 and the second antenna A2. The adjustment is performed either by the identifier Id or by the vehicle V.

It should be noted that adjustment is also referred to as calibration.

Adjustment by the Motor Vehicle V.

In a first non-limiting embodiment, the adjustment is performed by the motor vehicle V.

It should be noted that the second antennas A2 of the identifiers, notably when the latter are cellphones, vary in their performance according to the different types of cellphones used (that is to say, when they are made by different manufacturers), and even within a single range of cellphones made by the same manufacturer. The concept of different performance is taken to mean that, for the same signal sent by the first antenna A1 (which therefore has the same power), the different second antennas A2 will not receive the same signal power.

The second antenna A2 of an identifier Id must therefore be adjusted for use with the first antenna A1, particularly on its first use with said vehicle V.

Thus, in a non-limiting embodiment, the first antenna A1 is also adapted for adjusting the second antenna A2, notably on its first use with said motor vehicle V.

It should be noted that, for the purpose of starting, the motor vehicle identifies the identifier Id to check that it is an identifier which is enabled to start the motor vehicle. For this purpose, the motor vehicle V sends an interrogation frame to the identifier Id. In a non-limiting embodiment, the motor vehicle sends the value of the threshold power Ps in said interrogation frame for the identifier Id so that it can use this before responding to a starting request.

The threshold power Ps is thus saved to the memory of the identifier Id.

If the identifier Id receives a signal from the motor vehicle V with a power level below the threshold power Ps, no starting takes place.

It should be noted that, in order to check whether the identifier Id is being used for the first time with the motor vehicle V, it is simply necessary to see whether a value of the threshold power Ps is stored in the memory of said identifier Id. If this is the case, said identifier Id has already been used with said motor vehicle V.

Said calibration is performed when the identifier Id is located at a reference position Por.

Thus the identifier Id is also adapted to be positioned at said reference position Por.

The reference position Por comprises, for example, a receptacle Re adapted to receive the identifier Id.

In order to launch the adjustment, when the user presses the starter button of the vehicle V, on the first use of the identifier Id with the vehicle V (in the non-limiting example considered here), a computer associated with the starter button will send to the identifier Id of the vehicle V a command to the first antenna A1 for transmitting a first calibration signal Sgc.

Additionally, in a non-limiting embodiment, on the first use of the identifier Id with the vehicle V (in the non-limiting example considered here), for the purpose of positioning the identifier at the reference position Por, the identifier Id is also adapted for displaying on a screen Sc a message Msg (of the pop-up window type, in a non-limiting example) inviting the user of said identifier Id to position said identifier at the reference position Por and to launch the adjustment (by pressing an "OK" button, in a non-limiting example).

It should be noted that the first antenna A1 is placed at a predefined distance d2 from the reference position Por of the motor vehicle V.

In a non-limiting example, the predefined distance d2 is equal to ten centimeters. In another non-limiting example, the first antenna A1 is placed at the reference position Por; that is to say, the predefined distance d2 is substantially equal to zero.

In another non-limiting embodiment, the first antenna A1 is also adapted for adjusting the second antenna A2 on request, notably after the first use of the identifier Id. For example, the identifier Id may have a menu for launching the adjustment function associated with starting the motor vehicle V. As described above, a computer associated with the starter button will send to the identifier Id of the vehicle V a command to the first antenna A1 for transmitting a first calibration signal Sgc, and a message Msg may invite the user of said identifier Id to position said identifier Id at the reference position Por.

Figure 4:
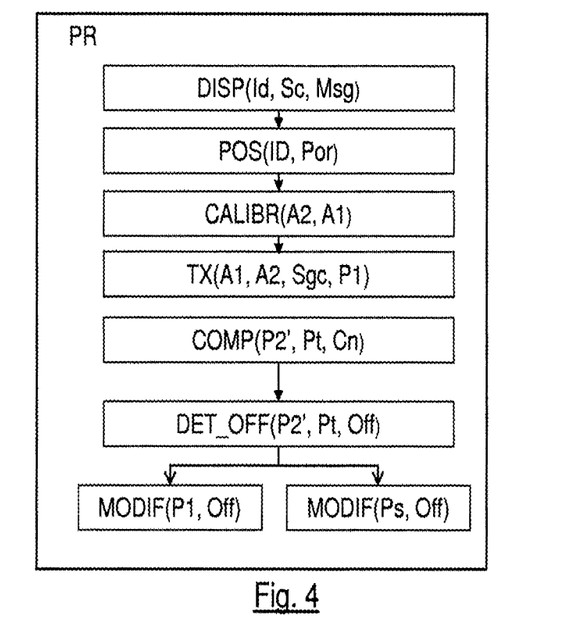
FIG. 4 shows a flow diagram of the adjustment of a communication channel between an antenna of the identifier and an antenna of the motor vehicle, said adjustment being performed by the detection method of FIG. 3.

Thus, for the adjustment, in a first non-limiting variant embodiment:
- the first antenna A1 is adapted for:
    - sending a first calibration signal Sgc at the nominal power P1 toward the second antenna A2;
- the second antenna A2 is adapted for:
    - measuring the power P2' of said corresponding reception signal Sgr received;
    - sending said measured power P2' toward said first antenna A1;
- the processing unit U1 of the computer CA1 is also adapted for:
    - comparing said measured power P2' with a theoretical power Pt corresponding to said predefined distance d2, using a regression curve Cn of power as a function of distance;
    - determining whether there is an offset Off between said measured power P2' and said theoretical power Pt;
    - if there is an offset Off, modifying the nominal power P1 of the first transmitted Bluetooth Low Energy™ signal Sg1 as a function of said offset Off, or modifying the threshold power Ps as a function of said offset Off.

In a second non-limiting variant embodiment,
the first antenna A1 is adapted for:
  sending a first calibration signal Sgc at the nominal power P1 toward the second antenna A2;
the second antenna A2 is adapted for:
  measuring the power P2' of said corresponding reception signal Sgr received;
the processing unit U2 of the identifier Id is adapted for:
  comparing said measured power P2' with a theoretical power Pt corresponding to said predefined distance d2, using a regression curve Cn of power as a function of distance;
  determining whether there is an offset Off between said measured power P2' and said theoretical power Pt;
  if there is an offset Off, sending said offset Off to said first antenna A1;
  modifying the nominal power P1 of the first transmitted Bluetooth Low Energy™ signal Sg1 as a function of said offset Off, or modifying the threshold power Ps as a function of said offset Off.

In this second variant, the processing unit U2 of the identifier Id makes the comparison. The measured power P2' does not need to be sent to the first antenna A1; only the offset Off needs to be sent.

In a non-limiting embodiment, the first antenna A1 is adapted for sending a plurality of first calibration signals Sgc at the nominal power P1 toward the second antenna A2. This enables a finer adjustment to be made.

In a non-limiting embodiment, the first antenna A1 is adapted for sending between ten and fifty first calibration signals Sgc at the nominal power P1 toward the second antenna A2. In a non-limiting variant embodiment, the first antenna A1 is adapted for sending thirty first calibration signals Sgc at the nominal power P1 toward the second antenna A2.

In a non-limiting embodiment, the mean M2 of the plurality of measurements of the power P2' and the standard deviation E2 are calculated. The interval between the standard deviation E2 and the mean M2 is then calculated.

Thus, I2=[M2−E2; M2+E2] is calculated.

The mean M3 of the measurements of the power P2' lying within this range I2 is calculated and then compared with said theoretical power Pt, as described above. Thus measurements which are excessively dispersed are not taken into account.

Figure 2:
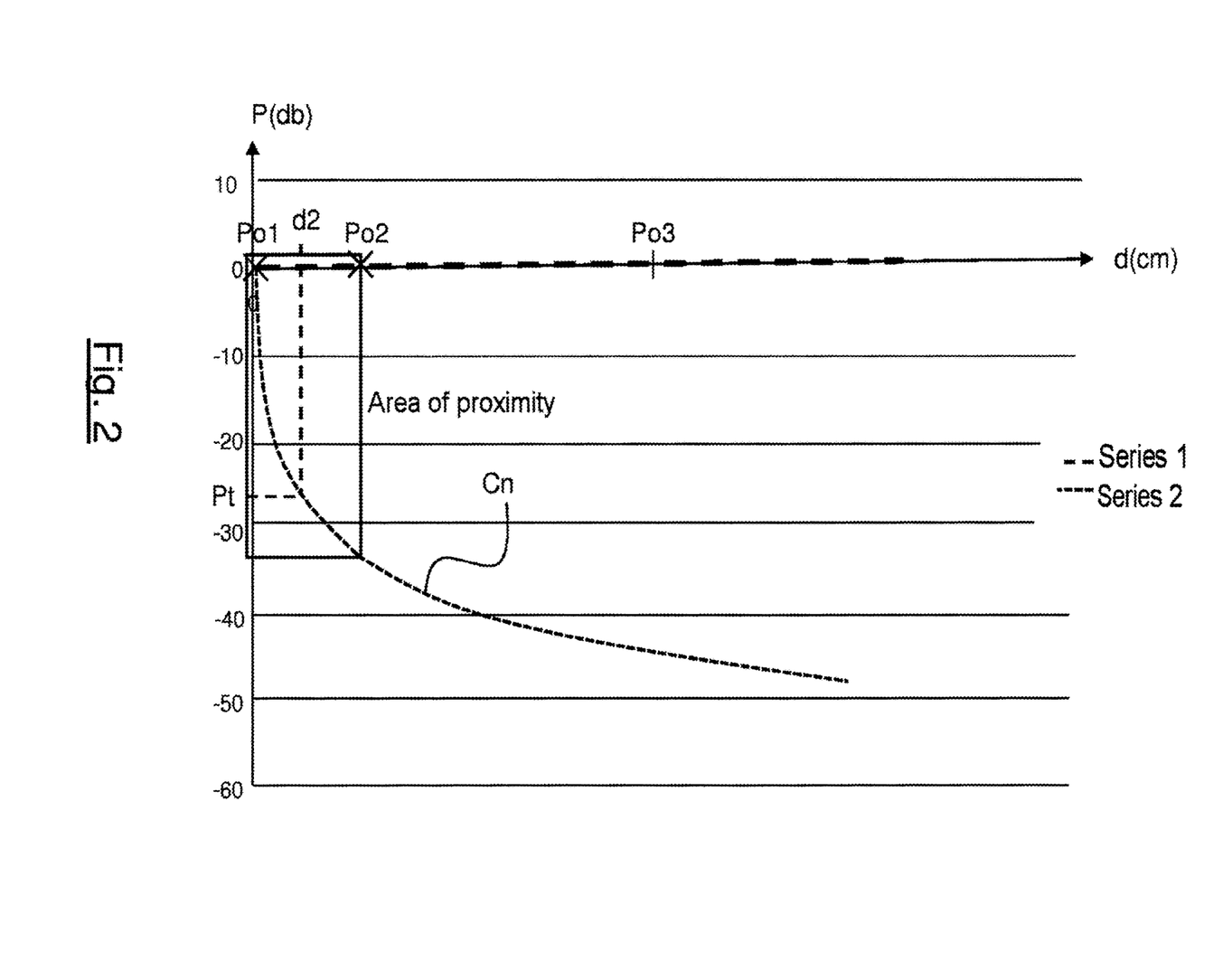
FIG. 2 shows a power reduction curve applicable to an identifier of the detection system of FIG. 1.

The curve Cn of power reduction with respect to distance (also called the regression curve or the RSSI (Received Signal Strength Indication) curve) is shown schematically in FIG. 2. This curve is valid for all identifiers Id which are cellphones. Distance (in centimeters) is shown on the horizontal axis, while power (in decibels, for example) is shown on the vertical axis. It can be seen on the curve Cn that there is a first interval (between points po1 and po2) in which the curve exhibits a strong gradient, and a second interval (between points po2 and po3) in which the curve shows a weak slope.

The predefined distance d2 is determined so as to lie within the first interval po1-po2. Thus the measured divergences of power will be more visible than in the second interval po2-po3, which facilitates calibration.

Thus, in the example where d2 is equal to ten centimeters, there will be a certain theoretical value of power Pt.

If there is a divergence Off between this theoretical value Pt and the measured value P2', this offset Off is taken into account.

In a first non-limiting embodiment, the nominal power P1 is modified as a function of this offset Off. For example, if the power P2' measured at the reference position Por (10 cm relative to the first antenna A1 in the example considered here) is less than the theoretical power Pt, this is manifested by the fact that the identifier Id is considered to be at a distance of more than 10 cm, although it is actually at 10 cm. The nominal power transmitted by the first antenna A1 must therefore be adjusted according to the regression curve to correct this offset, and in the example under consideration the nominal power P1 must be increased so that the identifier Id receives an expected power at the reference position.

In a second non-limiting embodiment, instead of modifying the nominal power P1 of transmission of the Bluetooth Low Energy™ signals by the first antenna A1, the threshold power Ps is modified as a function of said offset Off. The modification is performed in the identifier Id, which compares the measured power P1' with the threshold power Ps. In the example considered here, the threshold power Ps is reduced. Thus the threshold power Ps is set at a lower level.

Adjustment by the Identifier Id.

In a second non-limiting embodiment, the adjustment is performed by the identifier Id.

This embodiment allows adaptation to the vehicle environment and to the dispersion of the identifiers Id. In fact, parasitic signals may be present because of the vehicle environment, and the signal transmitted by an identifier Id may vary in its nominal power according to the type of identifier, or even within the same range of identifiers made by the same manufacturer.

Thus the detection method PR may comprise the adjustment of the first antenna A1 for use with the second antenna A2 of said identifier Id.

Thus, for the adjustment, in a first non-limiting variant embodiment:
the second antenna A2 is adapted for:
  transmitting a first calibration signal Sgc at the nominal power P1 toward the first antenna A1;
the first antenna A1 is adapted for:
  measuring the power P2' of said corresponding reception signal Sgr received, and sending said measured power P2' toward said second antenna A2;
the processing unit U2 of the identifier Id is adapted for:
  comparing said measured power P2' with a theoretical power Pt corresponding to said predefined distance d2, using a regression curve Cn of power as a function of distance;
  determining whether there is an offset Off between said measured power P2' and said theoretical power Pt;
  if there is an offset Off, modifying the nominal power P1 of the first transmitted Bluetooth Low Energy™ signal Sg1 as a function of said offset Off, or modifying the threshold power Ps as a function of said offset Off.

Thus, for the adjustment, in a second non-limiting variant embodiment:
the second antenna A2 is adapted for:
  transmitting a first calibration signal Sgc at the nominal power P1 toward the first antenna A1;
the first antenna A1 is adapted for:
  measuring the power P2' of said corresponding reception signal Sgr received;
the processing unit U1 of the computer CA1 is adapted for:

comparing said measured power P2' with a theoretical power Pt corresponding to said predefined distance d2, using a regression curve Cn of power as a function of distance;

determining whether there is an offset Off between said measured power P2' and said theoretical power Pt;

if there is an offset Off, modifying the nominal power P1 of the first transmitted Bluetooth Low Energy™ signal Sg1 as a function of said offset Off, or modifying the threshold power Ps as a function of said offset Off.

In this second variant, the computer CA1 makes the comparison. The measured power P2' does not need to be sent to the second antenna A2.

As in the first embodiment, in a non-limiting embodiment the second antenna A2 is adapted for sending a plurality of first calibration signals Sgc at the nominal power P1 toward the first antenna A1. This enables a finer adjustment to be made.

In a non-limiting embodiment, the second antenna A2 is adapted for sending between ten and fifty first calibration signals Sgc at the nominal power P1 toward the first antenna A1. In a non-limiting variant embodiment, the second antenna A2 is adapted for sending thirty first calibration signals Sgc at the nominal power P1 toward the first antenna A1.

It should be noted that the two adjustments (by the motor vehicle and by the identifier Id) may be performed in combination.

Figure 3:
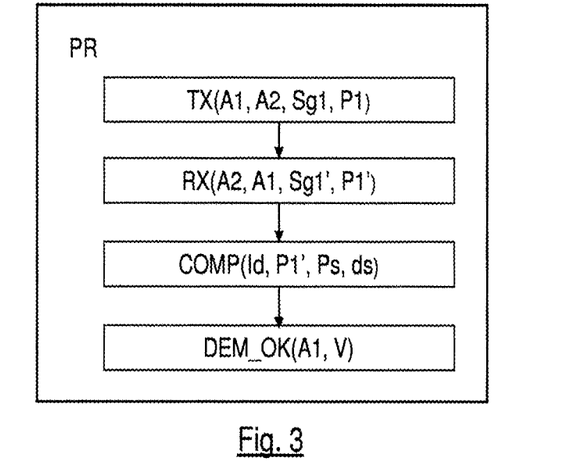
FIG. 3 shows a flow diagram of a method for detecting an identifier for starting a motor vehicle to be executed according to a non-limiting embodiment of the invention.

Thus the detection system SYS that has been described may be used to execute the method PR (shown in FIG. 3) for detecting an identifier Id for starting a motor vehicle V, said motor vehicle comprising a first antenna A1 and said identifier Id comprising a second antenna A2, said method P comprising:

transmitting, by means of said first antenna A1, a first Bluetooth Low Energy™ signal Sg1 toward said identifier Id at a nominal power P1 (illustrated function TX(A1, A2, Sg1, P1));

measuring the power P1' of said corresponding signal Sg1' received by the second antenna A2 of said identifier Id (illustrated function RX(A2, A1, Sg1', P1'));

comparing said measured power P1' with a threshold power Ps (illustrated function COMP(Id, P1', Ps, ds), said threshold power Ps corresponding to a threshold distance ds from said first antenna A1 which is smaller than the radius r1 of the circle C1 inscribed in the passenger compartment H of the motor vehicle V, said circle C1 being centered on said first antenna A1;

enabling the starting of the motor vehicle V if the measured power P1' is greater than or equal to said threshold power Ps (illustrated function DEM_OK(A1, V)).

In a non-limiting embodiment, the threshold distance ds is equal to twenty centimeters, plus or minus ten centimeters.

In non-limiting embodiments, the method PR also comprises the supplementary steps.

In a non-limiting embodiment, the method also comprises:

positioning said identifier Id at a reference position Por (function POS(Id, Por));

adjusting the second antenna A2 of said identifier Id for use with the first antenna A1 on the first use of said identifier Id with the motor vehicle V (function CALI-BR(A2, A1)).

In another non-limiting embodiment, the adjustment is performed when desired, even after the first use of the identifier Id. The adjustment may therefore be performed on the first use of said identifier, or on request after the first use of said identifier.

In a non-limiting embodiment, said first antenna A1 is placed at a predefined distance d2 from the reference position Por of the motor vehicle Por and the adjustment comprises:

transmitting, by means of the first antenna A1, a first calibration signal Sgc at the nominal power P1 toward the second antenna A2 (function TX(A1, A2, Sgc, P1));

measuring the power P2' of said corresponding reception signal Sgr received by said second antenna A2 (function MES(A2, P2')), and sending said measured power P2' toward said first antenna A1 (function TX(A2, A1, P2'));

comparing said measured power P2' with a theoretical power Pt corresponding to said predefined distance d2, using a regression curve Cn of power as a function of distance (function COMP(P2', Pt, Cn));

determining whether there is an offset Off between said measured power P2' and said theoretical power Pt (function DET_OFF(P2', Pt, Off));

if there is an offset Off, modifying the nominal power P1 of the first transmitted Bluetooth Low Energy™ signal Sg1 as a function of said offset Off (function MODIF (P1, Off)), or modifying the threshold power Ps as a function of said offset Off (function MODIF(Ps, Off)).

In a non-limiting embodiment, on the first use of the identifier Id1 with the motor vehicle V, the method further comprises the display by the identifier Id on a screen Sc of a message Msg inviting the user of said identifier Id to position said identifier in the reference position Por and to launch said adjustment (function DISP(Id, Sc, Msg)).

In a non-limiting embodiment, the method PR also comprises:

positioning said identifier Id at a reference position Por;

adjusting the first antenna A1 for use with the second antenna A2 of said identifier Id.

The adjustment is performed on the first use of said identifier Id with the motor vehicle V, or as desired.

Thus, in a first non-limiting variant embodiment, the adjustment comprises:

transmitting, by means of the second antenna A2, a first calibration signal Sgc at the nominal power P1 toward the first antenna A1;

measuring the power P2' of said corresponding reception signal Sgr received by said first antenna A1, and sending said measured power P2' toward said second antenna A2;

comparing said measured power P2' with a theoretical power Pt corresponding to said predefined distance d2, using a regression curve Cn of power as a function of distance;

determining whether there is an offset Off between said measured power P2' and said theoretical power Pt;

if there is an offset Off, modifying the nominal power P1 of the first transmitted Bluetooth Low Energy™ signal Sg1 as a function of said offset Off, or modifying the threshold power Ps as a function of said offset Off.

It should be noted that the two adjustments (by the first antenna A1 and by the second antenna A2) may be performed in combination.

In a non-limiting embodiment, the method PR comprises sending a plurality of first calibration signals Sgc and measuring a power P2' of the plurality of corresponding reception signals Sgr.

In a non-limiting embodiment, the method PR comprises:
calculating the mean M2 of the plurality of measurements of power P2';
calculating the standard deviation E2 of the plurality of measurements of power P2';
calculating the interval between the standard deviation E2 and the mean M2. Thus, I2=[M2−E2; M2+E2] is calculated.
calculating the mean M3 of the measurements of the power P2' lying within this range I2 and comparing this mean M3 with said theoretical power Pt, as described above.

The same calculations may be used for a plurality of second calibration signals Sgc and measurements of the power P2' of the plurality of corresponding reception signals Sgr.

Evidently, the description of the invention is not limited to the application, the embodiments and the examples described above.

Thus, in a non-limiting embodiment of the method, said first antenna A1 is placed at the reference position Por, that is to say at the position of the receptacle Re.

Thus, in a non-limiting embodiment of the method, the method further comprises enabling the starting of the motor vehicle V solely if the identifier Id is placed at the reference position Por of the motor vehicle V, that is to say on the receptacle Re.

Thus the invention that has been described provides, notably, the following advantages:
- it is simple to use;
- it may be used to determine an identifier inside the passenger compartment of a motor vehicle, and more particularly near the antenna of the motor vehicle;
- it allows the use of identifiers in the form of cellphones;
- it allows Bluetooth Low Energy™ technology to be used not only for access to the vehicle, but also for starting. Thus the same antenna is used at the vehicle end and at the identifier end. There is no need to use a different antenna for access and a supplementary antenna for starting;
- it allows costs to be reduced because of the use of a single antenna to perform the two different functions of access and starting; and
- it allows adjustment either from the identifier end Id or from the motor vehicle end.

The invention claimed is:

1. A method for detecting an identifier for starting a motor vehicle, said motor vehicle comprising a first antenna and said identifier comprising a second antenna, said method comprising:
transmitting, by said first antenna, a first Bluetooth Low Energy™ signal toward said identifier at a nominal power;
measuring the power of a corresponding Bluetooth Low Energy™ signal received by the second antenna of said identifier;
comparing said measured power with a threshold power corresponding to a threshold distance from said first antenna using a regression curve of power as a function of distance;
determining whether the measured power is greater than or equal to said threshold power;
enabling the starting of the motor vehicle when the measured power is greater than or equal to said threshold power;
positioning said identifier at a reference position; and
adjusting the second antenna of the identifier for use with the first antenna on the first use of the identifier with the motor vehicle, and/or on request;
wherein:
the first antenna is placed at a predefined distance from the reference position of the motor vehicle and the adjustment comprises:
transmitting, by the first antenna, a first calibration signal at the nominal power toward the second antenna,
measuring the power of a corresponding reception signal received by the second antenna, and sending the measured power toward said first antenna,
comparing the measured power with a theoretical power corresponding to said predefined distance, using a regression curve of power as a function of distance,
determining whether there is an offset between said measured power and said theoretical power, and
when the offset exists, modifying the nominal power of the first transmitted Bluetooth Low Energy™ signal as a function of said offset, or modifying the threshold power as a function of said offset,
the threshold distance is smaller than a radius of a circle inscribed in the passenger compartment of the motor vehicle, said circle being centered on said first antenna, and
the regression curve is a substantially exponential decaying curve.

2. The detection method as claimed in claim 1, according to which the threshold distance is equal to twenty centimeters, plus or minus ten centimeters.

3. The detection method as claimed in claim 1, wherein, on the first use of the identifier with the motor vehicle, the method further comprises the display by the identifier on a screen of a message inviting the user of said identifier to position said identifier in the reference position and to launch said adjustment.

4. The detection method as claimed in claim 1, according to which said first antenna is placed at the reference position.

5. The detection method as claimed in claim 1, further comprising enabling the starting of the motor vehicle solely if the identifier is placed at the reference position of the motor vehicle.

6. The detection method as claimed in claim 1, wherein the identifier is a cellphone.

7. The detection method as claimed in claim 1, further comprising:
positioning said identifier at a reference position; and
adjusting the first antenna of said identifier for use with the second antenna.

8. The detection method as claimed in claim 7, wherein said first antenna is placed at a predefined distance from the reference position of the motor vehicle and the adjustment comprises:
transmitting, by the second antenna, a first calibration signal at the nominal power toward the first antenna;
measuring the power of said corresponding reception signal received by said first antenna;
comparing said measured power with a theoretical power corresponding to said predefined distance, using a regression curve of power as a function of distance;
determining whether there is an offset between said measured power and said theoretical power; and
when the offset exists, modifying the nominal power of the first transmitted Bluetooth Low Energy™ signal as a function of said offset, or modifying the threshold power as a function of said offset.

9. The detection method as claimed in claim 1, wherein:
a plurality of first calibration signals are sent and a plurality of power measurements are made,
the measured power is compared with said theoretical power,
the measured power is equal to the mean of the measured powers lying within a range that depends on the standard deviation of the plurality of power measurements.

10. A system for detecting an identifier for starting a motor vehicle, said motor vehicle comprising a first antenna and a computer comprising a processing unit and said identifier comprising a second antenna and a processing unit, said system comprising:
said identifier; and
said first antenna,
said identifier being configured for:
receiving a first Bluetooth Low Energy™ signal transmitted by said first antenna at a nominal power,
measuring the power of said corresponding Bluetooth Low Energy™ signal received by the second antenna, and
comparing said measured power with a threshold power corresponding to a threshold distance from said first antenna using a regression curve of power as a function of distance,
determining whether the measured power is greater than or equal to said threshold power;
where the threshold distance is smaller than a radius of a circle inscribed in the passenger compartment of the motor vehicle, said circle being centered on said first antenna,
wherein the regression curve is a substantially exponential decaying curve,
said first antenna of the motor vehicle being configured for:
transmitting a first Bluetooth Low Energy™ signal toward said identifier at a nominal power,
said computer being configured for enabling the starting of the motor vehicle if the measured power is greater than or equal to said threshold power
wherein:
said identifier is adapted to be positioned at a reference position and said first antenna is adapted for calibrating the second antenna on a first use with the motor vehicle and/or on request,
when said first antenna is placed at a predefined distance from the reference position of the motor vehicle, and according to which, for the adjustment:
the first antenna is configured for:
sending a first calibration signal at the nominal power toward the second antenna,
the second antenna is configured for:
measuring the power of said corresponding reception signal received, and
sending said measured power toward said first antenna,
the processing unit of the computer is configured for:
comparing said measured power with a theoretical power corresponding to said predefined distance, using a regression curve of power as a function of distance,
determining whether there is an offset between said measured power and said theoretical power, and
when an offset exists, modifying the nominal power of the first transmitted Bluetooth Low Energy™ signal as a function of said offset, or modifying the threshold power as a function of said offset.

11. The detection system as claimed in claim 10, wherein the threshold distance is equal to twenty centimeters, plus or minus ten centimeters.

12. The detection system as claimed in claim 10, wherein said first antenna is placed at a predefined distance from the reference position of the motor vehicle, and according to which, for the adjustment:
the first antenna is further configured for:
sending a first calibration signal at the nominal power toward the second antenna,
the second antenna is further configured for:
measuring the power of said corresponding reception signal received,
the processing unit of the identifier is further configured for:
comparing said measured power with a theoretical power corresponding to said predefined distance using a regression curve of power as a function of distance,
determining whether there is an offset between said measured power and said theoretical power (Pt),
when an offset exists, sending said offset to said first antenna, and
modifying the nominal power of the first transmitted Bluetooth Low Energy™ signal as a function of said offset, or modifying the threshold power as a function of said offset.

13. The detection system as claimed in claim 10, wherein said second antenna is configured to adjust the first antenna.

14. The detection system as claimed in claim 13, wherein said first antenna is placed at a predefined distance from the reference position of the motor vehicle, and according to which, for the adjustment:
the second antenna is further configured for:
transmitting a first calibration signal at the nominal power toward the first antenna,
the first antenna is further configured for:
measuring the power of said corresponding reception signal received, and
sending said measured power toward said second antenna,
the processing unit of the identifier is further configured for:
comparing said measured power with a theoretical power corresponding to said predefined distance using a regression curve of power as a function of distance,
determining whether there is an offset between said measured power and said theoretical power, and
when an offset exists, modifying the nominal power of the first transmitted Bluetooth Low Energy™ signal as a function of said offset, or modifying the threshold power as a function of said offset.

15. The detection system as claimed in claim 13, wherein said first antenna is placed at a predefined distance from the reference position of the motor vehicle, and according to which, for the adjustment:
the second antenna is further configured for:
transmitting a first calibration signal at the nominal power toward the first antenna, the first antenna is further configured for:
  measuring the power of said corresponding reception signal received,
the processing unit of the computer is also adapted for:
  comparing said measured power with a theoretical power corresponding to said predefined distance using a regression curve of power as a function of distance,
  determining whether there is an offset between said measured power and said theoretical power, and
  when an offset exists, modifying the nominal power of the first transmitted Bluetooth Low Energy™ signal as a function of said offset, or modifying the threshold power as a function of said offset.

16. A system for detecting an identifier for starting a motor vehicle, said motor vehicle comprising a first antenna and a computer comprising a processing unit and said identifier comprising a second antenna and a processing unit, said system comprising:
  said identifier; and
  said first antenna,
  said identifier being configured for:
    receiving a first Bluetooth Low Energy™ signal transmitted by said first antenna at a nominal power, and
    measuring the power of said corresponding Bluetooth Low Energy™ signal received by the second antenna,
  said first antenna of the motor vehicle being configured for:
    transmitting a first Bluetooth Low Energy™ signal toward said identifier at a nominal power,
  said computer is configured for:
    comparing said measured power with a threshold power corresponding to a threshold distance from said first antenna using a regression curve of power as a function of distance,
    where the threshold distance is smaller than a radius of a circle inscribed in the passenger compartment of the motor vehicle, said circle being centered on said first antenna,
    determining whether the measured power is greater than or equal to said threshold power, and
    enabling the starting of the motor vehicle when the measured power is greater than or equal to said threshold power,
  wherein:
    the regression curve is a substantially exponential decaying curve,
    said identifier is adapted to be positioned at a reference position and said first antenna is adapted for calibrating the second antenna on a first use with the motor vehicle and/or on request,
    when said first antenna is placed at a predefined distance from the reference position of the motor vehicle, and according to which, for the adjustment:
      the first antenna is configured for:
        sending a first calibration signal at the nominal power toward the second antenna,
      the second antenna is configured for:
        measuring the power of said corresponding reception signal received, and
        sending said measured power toward said first antenna,
      the processing unit of the computer is configured for:
        comparing said measured power with a theoretical power corresponding to said predefined distance, using a regression curve of power as a function of distance,
        determining whether there is an offset between said measured power and said theoretical power, and
        when an offset exists, modifying the nominal power of the first transmitted Bluetooth Low Energy™ signal as a function of said offset, or modifying the threshold power as a function of said offset.

17. The detection system as claimed in claim 16, wherein said first antenna is placed at a predefined distance from the reference position of the motor vehicle, and according to which, for the adjustment:
  the first antenna is further configured for:
    sending a first calibration signal at the nominal power toward the second antenna,
  the second antenna is further configured for:
    measuring the power of said corresponding reception signal received,
  the processing unit of the identifier is further configured for:
    comparing said measured power with a theoretical power corresponding to said predefined distance using a regression curve of power as a function of distance,
    determining whether there is an offset between said measured power and said theoretical power (Pt),
    when an offset exists, sending said offset to said first antenna, and
    modifying the nominal power of the first transmitted Bluetooth Low Energy™ signal as a function of said offset, or modifying the threshold power as a function of said offset.

18. The detection system as claimed in claim 16, wherein said second antenna is configured to adjust the first antenna.

19. The detection system as claimed in claim 18, wherein said first antenna is placed at a predefined distance from the reference position of the motor vehicle, and according to which, for the adjustment:
  the second antenna is further configured for:
    transmitting a first calibration signal at the nominal power toward the first antenna,
  the first antenna is further configured for:
    measuring the power of said corresponding reception signal received, and
    sending said measured power toward said second antenna,
  the processing unit of the identifier is further configured for:
    comparing said measured power with a theoretical power corresponding to said predefined distance using a regression curve of power as a function of distance,
    determining whether there is an offset between said measured power and said theoretical power, and
    when an offset exists, modifying the nominal power of the first transmitted Bluetooth Low Energy™ signal as a function of said offset, or modifying the threshold power as a function of said offset.

20. The detection system as claimed in claim 18, wherein said first antenna is placed at a predefined distance from the reference position of the motor vehicle, and according to which, for the adjustment:

the second antenna is further configured for:
  transmitting a first calibration signal at the nominal power toward the first antenna,
the first antenna is further configured for:
  measuring the power of said corresponding reception signal received,
the processing unit of the computer is also adapted for:
  comparing said measured power with a theoretical power corresponding to said predefined distance using a regression curve of power as a function of distance,
  determining whether there is an offset between said measured power and said theoretical power, and
  when an offset exists, modifying the nominal power of the first transmitted Bluetooth Low Energy™ signal as a function of said offset, or modifying the threshold power as a function of said offset.

* * * * *